(12) United States Patent
Koerner et al.

(10) Patent No.: US 12,139,020 B2
(45) Date of Patent: Nov. 12, 2024

(54) DEVICE AND METHOD FOR SUPPLYING ENERGY TO A SENSOR DEVICE IN A RAIL VEHICLE

(71) Applicant: SIEMENS MOBILITY GMBH, Munich (DE)

(72) Inventors: Olaf Koerner, Nuremberg (DE); Simon Matthias Wokusch, Erlangen (DE)

(73) Assignee: Siemens Mobility GmbH, Munich (DE)

( * ) Notice: Subject to any disclaimer, the term of this patent is extended or adjusted under 35 U.S.C. 154(b) by 896 days.

(21) Appl. No.: 17/280,342

(22) PCT Filed: Sep. 3, 2019

(86) PCT No.: PCT/EP2019/073388
§ 371 (c)(1),
(2) Date: Mar. 26, 2021

(87) PCT Pub. No.: WO2020/064274
PCT Pub. Date: Apr. 2, 2020

(65) Prior Publication Data
US 2022/0032776 A1 Feb. 3, 2022

(30) Foreign Application Priority Data
Sep. 26, 2018 (DE) ...................... 10 2018 216 436.3

(51) Int. Cl.
*B60L 1/00* (2006.01)
*B61L 15/00* (2006.01)
*H02J 50/10* (2016.01)

(52) U.S. Cl.
CPC ............. *B60L 1/00* (2013.01); *B61L 15/0081* (2013.01); *H02J 50/10* (2016.02); *B60L 2200/26* (2013.01)

(58) Field of Classification Search
CPC ........ B60L 1/00; B60L 2200/26; H02J 50/10; B61L 15/0081
(Continued)

(56) References Cited

U.S. PATENT DOCUMENTS 9,099,947 B2    8/2015  Jiang
9,156,477 B2 *  10/2015 Cooper ............... B61L 15/0036
(Continued)

FOREIGN PATENT DOCUMENTS

CN          103368128 A    10/2013
CN          104057779 A    9/2014
(Continued)

*Primary Examiner* — Alfonso Perez Borroto
(74) *Attorney, Agent, or Firm* — Laurence A. Greenberg; Werner H. Stemer; Ralph E. Locher

(57) ABSTRACT

A device for supplying energy to a sensor arrangement in a rail vehicle. The device has at least one second electrical conductor which has an inductive coupling to a first electrical conductor. The first electrical conductor connects a converter to a motor of the rail vehicle. The device has a switching module which is operated by way of an operating voltage and has the purpose of processing signals of at least one sensor. The at least one sensor serves to acquire data and/or detect a state of a vehicle component. The switching module is connected to a second electrical conductor. The second electrical conductor is configured to generate the operating voltage from an alternating voltage, applied to the first conductor, by way of induction in the second electrical conductor.

10 Claims, 5 Drawing Sheets

(58) Field of Classification Search
USPC .......................................... 307/9.1
See application file for complete search history.

(56) References Cited

U.S. PATENT DOCUMENTS

| | | | |
|---|---|---|---|
| 2008/0201028 A1* | 8/2008 | Brooks | B61L 15/0058 701/20 |
| 2009/0187291 A1* | 7/2009 | Daum | B61L 15/0058 701/19 |
| 2012/0326521 A1* | 12/2012 | Bauer | B60L 53/124 307/104 |
| 2013/0020862 A1* | 1/2013 | Miller | H02J 50/90 307/9.1 |
| 2013/0193276 A1* | 8/2013 | Hunter | B61L 25/025 342/385 |
| 2014/0288739 A1 | 9/2014 | Braun et al. | |
| 2017/0047676 A1 | 2/2017 | Yokoyama | |
| 2017/0349276 A1 | 12/2017 | Fenny | |
| 2018/0241234 A1* | 8/2018 | Liang | B60L 53/65 |

FOREIGN PATENT DOCUMENTS

| | | |
|---|---|---|
| CN | 107458599 A | 12/2017 |
| DE | 102009043225 A1 | 3/2011 |
| DE | 112011104872 T5 | 11/2013 |
| DE | 102012220660 A1 | 5/2014 |
| DE | 102016109263 A1 | 11/2017 |
| EP | 3299825 A1 | 3/2018 |
| WO | 2012063439 A1 | 5/2012 |

\* cited by examiner

DEVICE AND METHOD FOR SUPPLYING ENERGY TO A SENSOR DEVICE IN A RAIL VEHICLE

BACKGROUND OF THE INVENTION

Field of the Invention:

The invention relates to the supply of electrical energy to a sensor facility in a rail vehicle. The sensor facility or relevant sensors can be arranged in particular in the region of a vehicle component of the rail vehicle.

An electronic device in or on a rail vehicle, in particular on the motor or transmission and specifically in or on a bogie of the rail vehicle, has to be provided with a reliable and adequate energy supply. The electronic device may have a sensor for the acquisition of data, e.g. accelerations, rotational speeds or temperatures. A sensor can also be used to acquire the state of components that are subject to wear, e.g. motor bearings and transmission bearings.

Conventional so-called sensor boxes, which are attached to a motor or transmission for the purpose of installing sensors, usually contain batteries that supply the sensor or further components of the sensor box with electrical energy. The capacity of the batteries is not sufficient for continuous operation of the sensor and uninterrupted transfer of data over an extended time. Moreover, the service life of the batteries can be significantly reduced by the environmental conditions, e.g. temperature fluctuations. Frequent replacement of the batteries may therefore be required, though this should be avoided if possible due to the usually restricted accessibility of the sensor box.

DE 10 2009 043 225 A1 specifies various local energy supplies for sensors in the bogie or chassis. In this context, it is proposed to utilize the heat that is generated in the wheel bearing or to convert the kinetic energy of the rotating components formed by the wheelsets and wheelset bearings into electrical energy with the aid of induction coils. It is also proposed to utilize diverse relative movements or deflections that occur, in particular oscillations and shocks that occur at the wheelset bearing and at the chassis frame, to generate electrical energy with the aid of piezo elements.

SUMMARY OF THE INVENTION

The object of the present invention is to specify an energy supply for a sensor arrangement, which does not require any batteries or long cable connections.

This object is achieved in each case by the respective features of the device and the method in the independent claims. Embodiments are specified in the dependent claims.

According to the invention, a device for supplying energy to a sensor arrangement in a rail vehicle has at least one second electrical conductor which has an inductive coupling to a first electrical conductor, wherein the first electrical conductor connects a converter to a motor of the rail vehicle. Furthermore, the device has a switching module which is operated by means of an operating voltage and has the purpose of processing signals of at least one sensor, the at least one sensor serving to acquire data and/or a state of a vehicle component. In this case, the switching module is connected to the second electrical conductor and the second electrical conductor is configured to generate the operating voltage from an alternating voltage, applied to the first conductor, by means of induction in the second electrical conductor. As a result of generating the required operating voltage for the switching module by means of induction, there is advantageously no need for a battery to supply the switching module.

In an embodiment of the invention, the first electrical conductor is embodied as at least part of a motor cable which connects the converter to the motor. This has the advantage in particular that the alternating voltage for the motor is also used for the energy supply of the switching module.

In a further embodiment of the invention, the at least one sensor is part of a sensor arrangement and the switching module is connected to the sensor arrangement or is likewise part of the sensor arrangement. This embodiment has the advantage in particular of an improved energy supply for a sensor arrangement which is arranged e.g. directly on the motor or on a transmission connected thereto.

In a further embodiment of the invention, the sensor arrangement is configured to acquire data from the motor, in particular the motor which is embodied as a drive motor, a transmission, a fan motor, a pump motor or a compressor motor as a component of the vehicle which is arranged in particular in or on a bogie of the rail vehicle.

In a further embodiment of the invention, the device has a component for rectification, which is connected between the second electrical conductor and the switching module. This embodiment has the advantage in particular that a switching module or a sensor with a conventional integrated circuit can be operated using the energy supply.

In a further embodiment of the invention, the device has a component for storing energy, said component being connected to the second electrical conductor and the switching module. This embodiment has the advantage in particular that the energy supply is still guaranteed if there is a temporary interruption of the alternating voltage. The energy store in this case can have considerably less capacity than the usual batteries, since the interruptions are usually of only short duration.

In a further embodiment of the invention, at least one section of the second electrical conductor is embodied as a winding of a coil. This embodiment has the advantage in particular of efficient induction.

In a further embodiment, the coil has an annular core, said core surrounding the first electrical conductor concentrically. The annular core in this case can comprise in particular a material that can be magnetized. This embodiment has the advantage in particular that the induced voltage is particularly high.

In a further embodiment, the first electrical conductor takes the form of at least part of a motor cable, wherein the coil surrounds the motor cable.

In a further embodiment, the device also has a component for rotational speed measurement, said component being attached to the second electrical conductor and being set up to determine a rotational speed of the motor from a frequency of an operating current which flows in the first conductor or from the alternating voltage that is applied to the first conductor. This embodiment has the advantage in particular that the rotational speed of the motor can be determined without additional sensors.

In a further embodiment, the device also has a component for current signature analysis, said component being attached to the second electrical conductor and being set up to analyze a frequency spectrum of an operating current which flows in the first conductor or the alternating voltage that is applied to the first conductor. This embodiment has the advantage in particular that the current signature analysis can take place without additional sensors.

In the method for supplying energy to a sensor arrangement in a rail vehicle, an alternating voltage is applied to a first electrical conductor through which a current flows at least some of the time and which connects a converter to a motor of the rail vehicle. A further alternating voltage is generated in a second electrical conductor, which has an inductive coupling to the first electrical conductor, by means of induction. The further alternating voltage is used to supply energy to a switching module which serves to process signals of at least one sensor for acquiring data and/or a state of a vehicle component.

The properties, features and advantages specified above, and the manner of their embodiment, are explained in greater detail below by an extensive description of exemplary embodiments with reference to the appended figures.

DETAILED DESCRIPTION OF THE INVENTION

Figure 1:
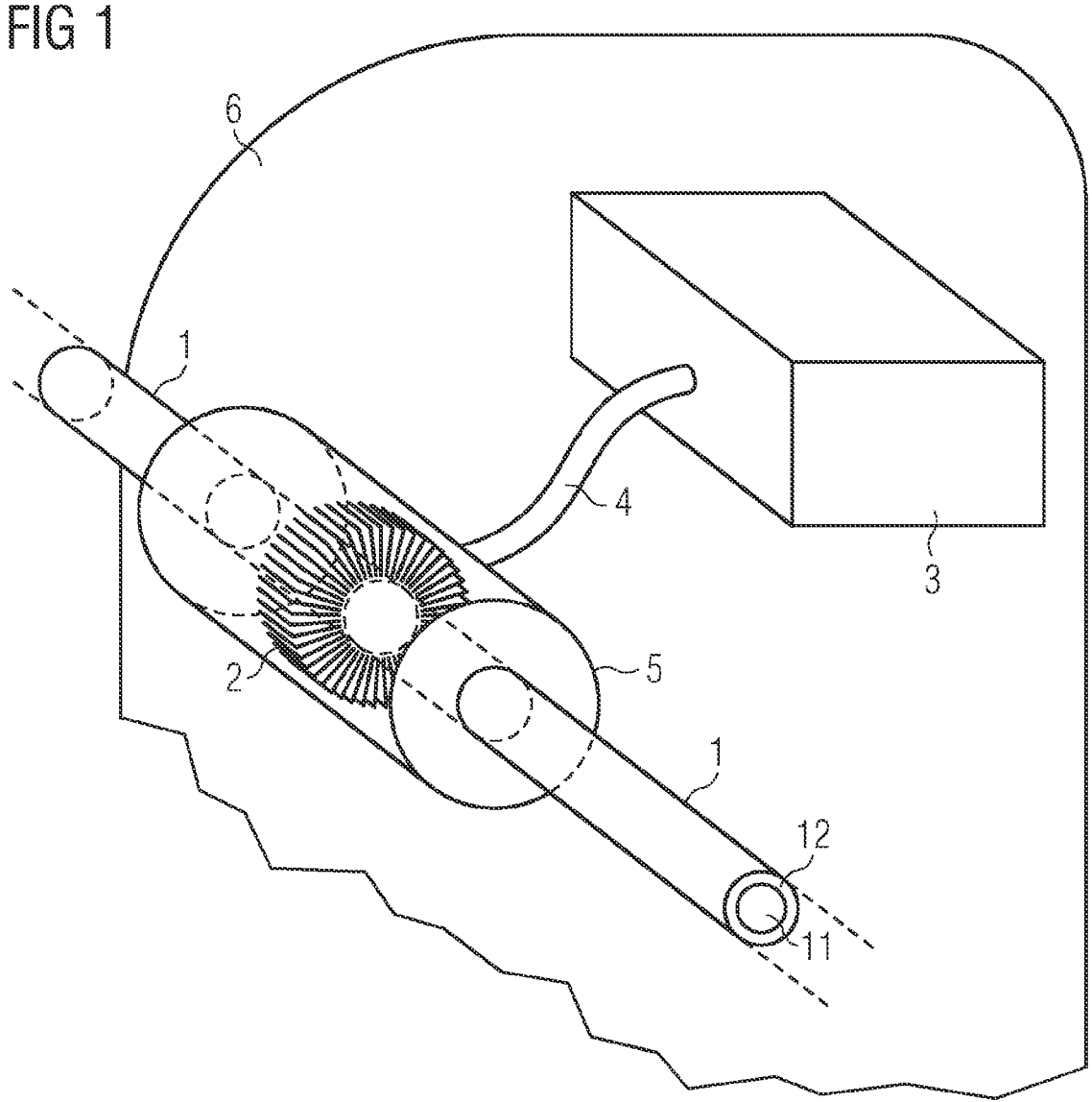
FIG. 1 shows a schematic illustration of a device for supplying energy to a sensor box.

FIG. 1 shows an arrangement comprising a first electrical conductor 1, a second electrical conductor 2, a sensor box 3, a connection line 4 between the second electrical conductor 2 and the sensor box 3, a housing 5 and a vehicle component 6. The first electrical conductor 1 and the second electrical conductor 2 are coupled together inductively.

The first electrical conductor 1 is in particular a section of a motor cable which has e.g. a conductor 11 and a sheath 12. Such a motor cable is used e.g. as a traction motor cable of a vehicle, in particular an electrically operated rail vehicle. The motor cable in this case connects a converter for an alternating voltage to the drive motor of the vehicle. The motor cable can however also have another function instead. It is important for the energy supply that an alternating voltage is applied to the first electrical conductor 1.

The second electrical conductor 2 has in particular a coil as illustrated schematically in FIG. 1. Use of a coil with a plurality of electrically conductive windings results in a higher alternating voltage being induced than when a linear electrical conductor is used. The function of the coil corresponds to the function of the secondary coil of a transformer and therefore needs no further explanation.

The sensor box 3 contains e.g. one or a plurality of sensors and further components if applicable. A switching module, which is provided to operate the sensor and to acquire, store and/or process sensor data, is e.g. likewise arranged in the sensor box 3. The switching module is e.g. an integrated circuit, in particular a microprocessor or microcontroller. A connection line 4 is provided between the second electrical conductor 2 and the sensor box 3 in order to transfer the generated electrical energy and, if applicable, signals to the sensor box 3.

The sensor box 3 is suitable for the installation of the sensor, but is not essential. Sensors can also be installed on a vehicle component 6 directly. The switching module can also be contained e.g. in a housing 5 which can be provided for the purpose of holding the first electrical conductor 1 and the second electrical conductor 2. The vehicle component 6 is illustrated only schematically, since the sensor can in principle be attached to any desired vehicle component, in particular e.g. the motor, the transmission, the wheel bearing or a bogie of a rail vehicle.

Induction of an alternating voltage in the second electrical conductor 2 essentially takes place as a result of the inductive coupling between the parallel sections of the first electrical conductor 1 and the second electrical conductor 2. It is therefore appropriate for the coil to be wound in such a way that sections of the windings run parallel to the first electrical conductor 1. If the first electrical conductor 1 is a section of a motor cable or traction motor cable that is arranged in a straight line, it can therefore be appropriate for each winding of the coil to be arranged substantially in one of the planes in which the first electrical conductor 1 runs, i.e. in one of the planes in the pencil of planes along whose straight line or axis the first electrical conductor 1 runs.

Figure 2:
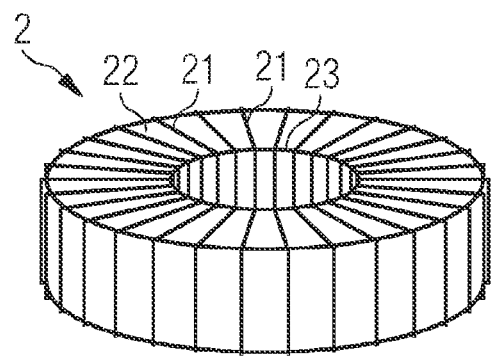
FIG. 2 shows a schematic illustration of a coil that can be used in the device.

FIG. 2 shows an example of a coil which is particularly suitable as a second electrical conductor 2 if the first electrical conductor 1 runs in a straight line. The electrically conductive winding 21 is mounted on an annular core 22, for example. Such a coil 2 is arranged in such a way that the core 22 surrounds the first electrical conductor 1 concentrically as illustrated schematically in FIG. 1. The first electrical conductor 1 runs through the internal opening 23 of the core 22 in this case.

The core 22 has e.g. the shape of a torus or the shape of a hollow cylinder as shown in FIG. 2. The core 22 comprises e.g. a material that can be magnetized such as iron or an iron compound, for example, if a strong inductive coupling is desired. Alternatively, it may be sufficient for the core 22 to merely have the function of stabilizing the winding 21 mechanically, in which case the core 22 is made of a plastic, for example.

Other shapes of the second electrical conductor 2 lie within the scope of the invention. In particular, it may be sufficient for the second electrical conductor 2 to have only a section which is parallel to the first electrical conductor 1; such an arrangement can suffice if the switching module has only a very low power consumption or if it is not intended to operate the switching module and/or the sensor continuously.

Figure 3:
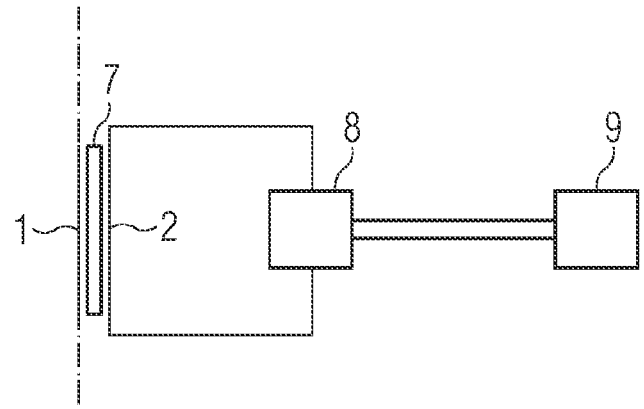
FIG. 3 shows a block diagram of a device for supplying energy.

FIG. 3 shows a block schematic diagram of a device for supplying energy, comprising a first electrical conductor 1 and parallel thereto a second electrical conductor 2, between which an inductive coupling 7 is present. The second electrical conductor 2 is connected to a component for rectification 8, in which the induced alternating voltage is rectified by means of a diode, for example. The direct voltage is supplied to the switching module 9 as an operating voltage. The switching module 9 has in particular a microprocessor or microcontroller. If the switching module 9 has an integrated circuit, the component for rectification 8 may be integrated therein. The component for rectification 8 may be omitted if the switching module 9 can be operated using alternating voltage.

A sensor can also be integrated in the switching module 9. Inter alia, inertia sensors, temperature sensors and humidity sensors can be designed as integrated sensors. Inertia sensors can be designed in silicon as e.g. microelectromechanical systems or micromechanical components, and deployed as e.g. acceleration sensors, rotational speed sensors or oscillation sensors and vibration sensors.

Figure 4:
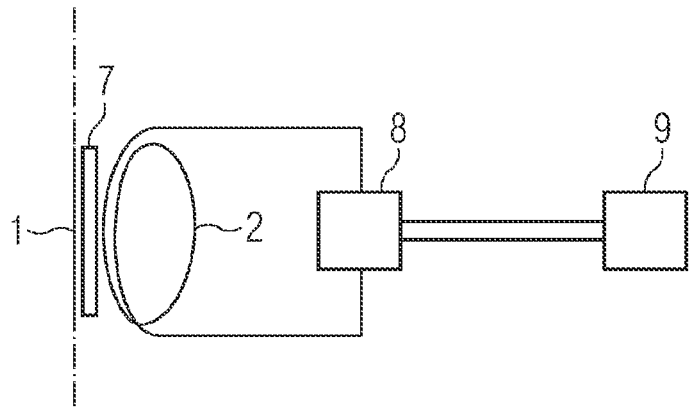
FIG. 4 shows a block diagram as per FIG. 3 with a coil.

FIG. 4 shows a block schematic diagram of a device for supplying energy as per FIG. 3, in which the second electrical conductor 2 is formed by a coil. The coil is illustrated only schematically in the diagram in FIG. 4. The other components correspond to the components of the diagram in FIG. 3 and are denoted by the same reference characters.

Figure 5:
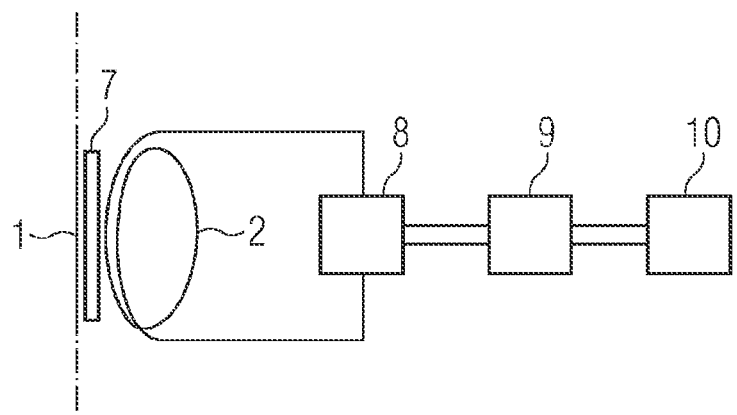
FIG. 5 shows a block diagram as per FIG. 4 with a sensor arrangement.

FIG. 5 shows a block schematic diagram of a device for supplying energy as per FIG. 4, in which a separate sensor arrangement 10 is additionally connected to the switching module 9. The switching module 9 is arranged e.g. together with the component for rectification 8 in a housing 5 of the electrical conductors 1, 2 (FIG. 1), and the sensor arrangement 10 is arranged e.g. in a sensor box 3. Instead of this, the switching module 9 and the sensor arrangement 10 can be arranged together in a sensor box 3. The component for rectification 8 can be arranged separately or integrated in the switching module 9. The sensor arrangement 10 can have a single sensor or instead can have more than one sensor. Various types of sensor can be included therein. The described energy supply is suitable for different embodiments of the sensors.

Figure 6:
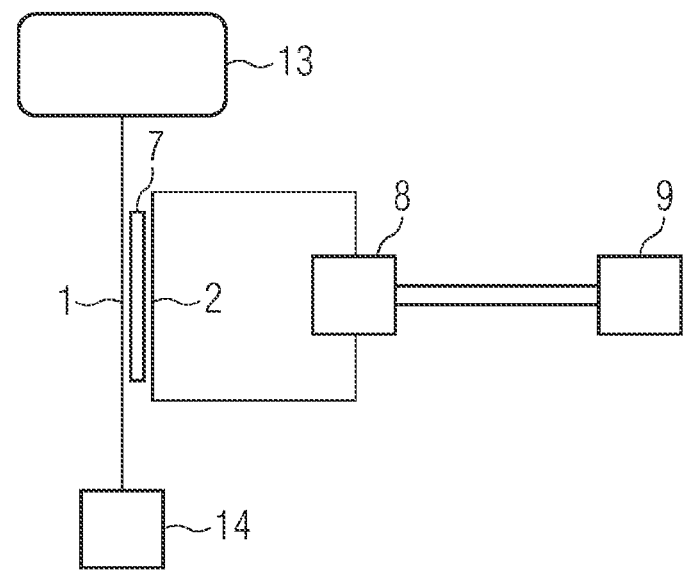
FIG. 6 shows a block diagram as per FIG. 3 with converter and motor.

FIG. 6 shows a block schematic diagram of a device for supplying energy as per FIG. 3 with converter and motor. The converter 14 delivers the alternating voltage which induces the further alternating voltage, provided for the purpose of supplying energy to the switching module 9, in the second electrical conductor 2. The converter 14 is connected to the motor 13 via a motor cable. The first electrical conductor 1 is formed by a section of the motor cable in this case.

If the alternating voltage is used to drive the motor 13, the motor cable can be the traction motor cable. The remaining components correspond to the components of the diagram in FIG. 3 and are denoted by the same reference characters.

Figure 7:
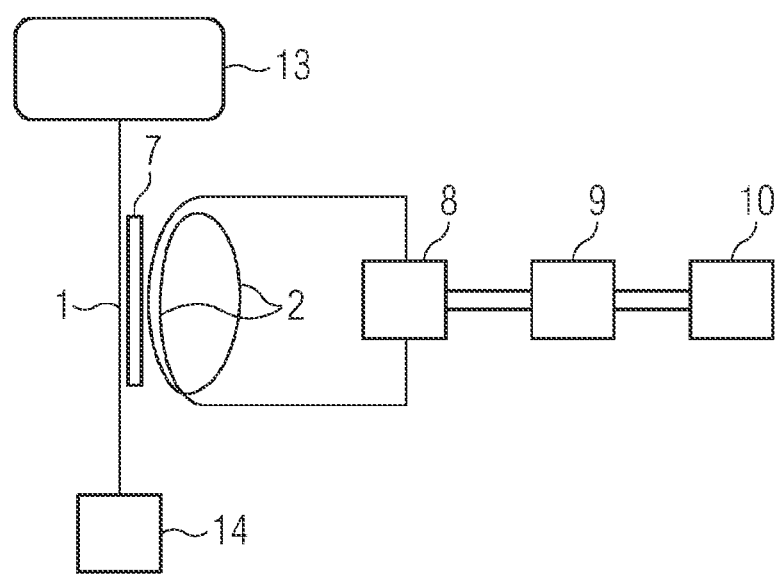
FIG. 7 shows a block diagram as per FIG. 6 with a coil.

FIG. 7 shows a block schematic diagram of a device for supplying energy as per FIG. 4 with converter and motor. The second electrical conductor 2 is formed by a coil in this case. The coil is illustrated only schematically in the diagram in FIG. 7. The remaining components correspond to the components of the diagram in FIG. 6 and are denoted by the same reference characters.

Figure 8:
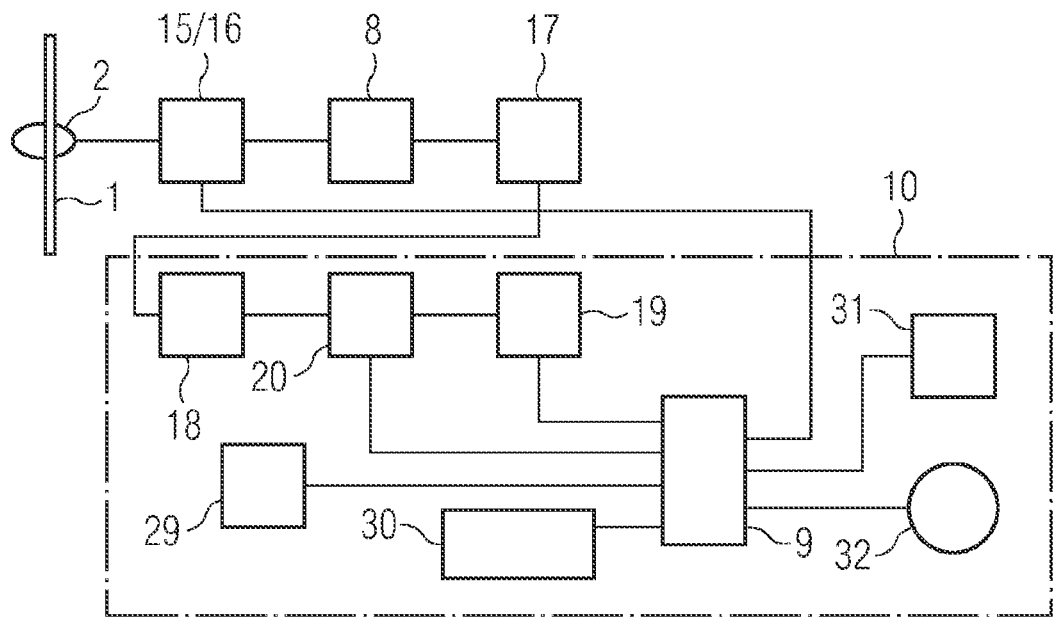
FIG. 8 shows a block diagram of a device for supplying energy with further components.

FIG. 8 shows a block schematic diagram of a device for supplying energy with further components. Attached to the coil 2 is a component for rotational speed measurement 15 and/or a component for current signature analysis 16. If the first electrical conductor 1 is e.g. a section of a traction motor cable, the rotational speed of the motor, which is driven by an alternating voltage that is applied to the traction motor cable, can be determined from the frequency of the alternating voltage, the number of pole pairs of the motor being taken into account. It is also possible to analyze the frequency spectrum of the applied alternating voltage and the change thereof relative to time, in order that properties of the motor can be ascertained thus. Per se known methods of signal analysis can be applied for this purpose. Alternatively, the component for rotational speed measurement 15 and/or for current signature analysis 16 can also be omitted.

In the case of the current signature analysis the motor current is monitored, wherein this can be effected e.g. by means of monitoring one of the three phases of an applied operating voltage. The relevant phase is usually applied to one of three traction motor cables, and a section of this traction motor cable can be used as the first electrical conductor 1 in the device described here. The stator windings of the motor are used as a transducer and the currents induced in the rotor are picked up as signals and supplied to e.g. a spectrum analyzer. Various error conditions result in a modulation of the ideal sinusoidal signal profile. The error conditions that are present can be inferred from the analysis of this modulation. Such a current signature analysis is used e.g. to monitor the state of the motor, to detect damage to the motor caused by wear, incorrect assembly or overloading, e.g. an imbalance, damage to bearings or damage to the suspension, or to implement continuous self-checking of the motor state, without having to attach additional sensors.

A component for voltage restriction 17 can be connected downstream of the component for rectification 8 and restrict the operating voltage using e.g. a shunt resistor. Voltage restriction may be required if the applied alternating voltage fluctuates significantly such that the induced alternating voltage occasionally exceeds the permitted range for the operating voltage. If only slight fluctuations are anticipated in the applied alternating voltage, the operating voltage can be suitably adjusted solely by dimensioning the second electrical conductor 2, such that the component for voltage restriction 17 can be omitted.

A component for DC conversion 18 is optionally connected between the component for rectification 8 or the component for voltage restriction 17 and the switching module 9 or a component for energy storage 20. The component for energy storage 20 is e.g. a capacitor or a small accumulator and serves to ensure a uniform energy supply. This can be beneficial in particular if the alternating voltage is not applied to the first electrical conductor 1 continuously, such that in the meanwhile no alternating voltage is induced in the second electrical conductor 2. This can occur e.g. if the first electrical conductor 1 is a section of a traction motor cable and occasionally neither acceleration nor braking of the vehicle is effected by the motor and therefore no current flows during this time. The component for energy storage 20 is also connected to the switching module 9, such that the switching module 9 is supplied with sufficient electrical energy at all times.

An optional further component for DC conversion 19 can be connected between the component for energy storage 20 and the switching module 9. The selection and connection of this and other further components can be adapted to the respectively intended application of the device independently of the energy supply.

FIG. 8 also shows an optional communications module 29, which can be provided for the purpose of outputting the data that is acquired or processed in the switching module 9 or for transferring it to display instruments. A likewise optional data store 30, which can comprise e.g. flash memory, EEPROMs or other electronic memory, in particular non-volatile electronic memory, is provided e.g. for the purpose of storing data and is connected to the switching module 9.

Marked on the diagram in FIG. 8 are exemplary sensors: a first sensor 31, which can be e.g. a temperature sensor, and a second sensor 32, which can be e.g. a micromechanical inertia sensor. The number and nature of the sensors is unlimited and can be selected according to the requirements of the respective application of the device. The sensors 31, 32 are connected to the switching module 9.

The dash-dot outline in FIG. 8 indicates that the sensor arrangement 10 can have, in addition to the sensors 31, 32, the switching module 9, if applicable the components for DC conversion 18, 19, the component for energy storage 20, the communications module 29 and the data store 30. The sensor arrangement 10 is installed in a sensor box 3, for example.

Figure 9:
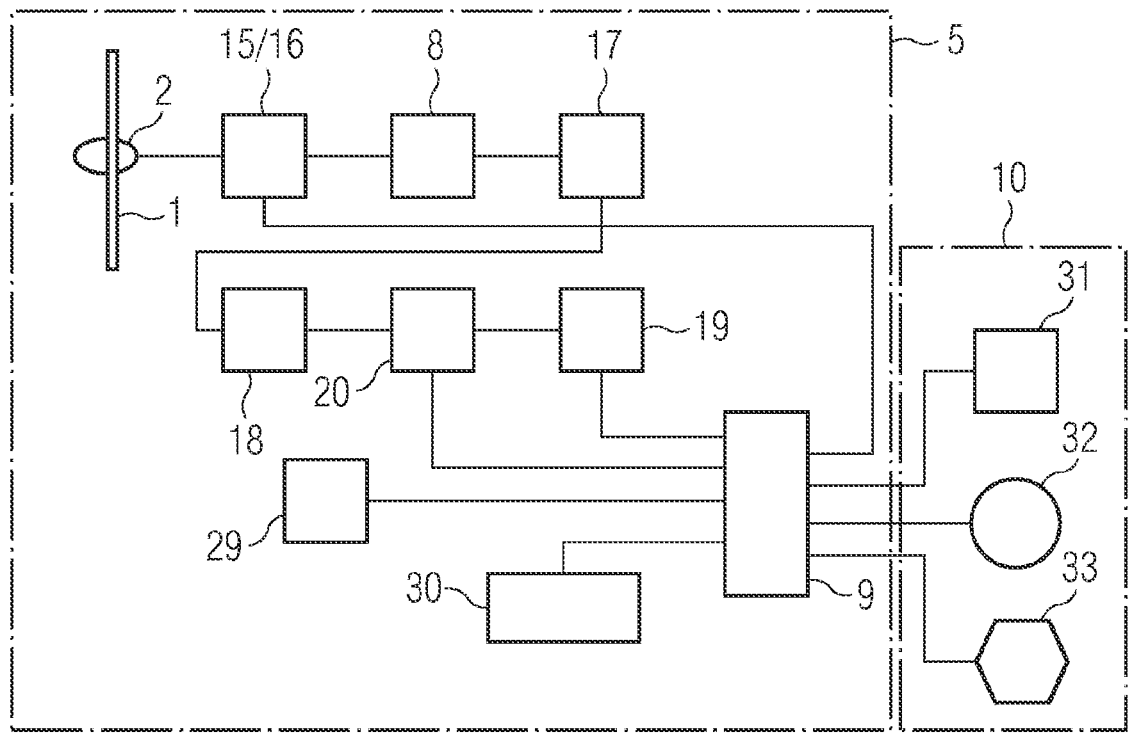
FIG. 9 shows a block diagram as per FIG. 8 with a different arrangement of the components.

FIG. 9 shows a block schematic diagram of a device for supplying energy as per FIG. 8 with a different arrangement of the components. In the diagram in FIG. 9, the sensor arrangement 10 additionally includes a third sensor 33, which can be e.g. a humidity sensor or a further inertia sensor. The remaining components correspond to the components of the diagram in FIG. 8 and are denoted by the same reference characters. Also in this device, the component for rotational speed measurement 15 and/or for current signature analysis 16 can be omitted.

The dash-dot outline in FIG. 9 indicates that the component for rectification 8, the switching module 9, the component for rotational speed measurement 15 or the component for current signature analysis 16, the component for voltage restriction 17, the components for DC conversion 18, 19, the component for energy storage 20, the communications module 29 and the data store 30 can be arranged in a housing 5 of the first electrical conductor 1 and the second electrical conductor 2, while the sensor arrangement 10 contains the sensors 31, 32 and 33. A different distribution of the components over the housing 5 and the sensor arrangement 10, which can be installed in a sensor box, is possible instead of this. Components of this device can also arranged outside the housing 5 or the sensor box 3. The housing 5 and/or the sensor box 3 can be omitted.

Figure 10:
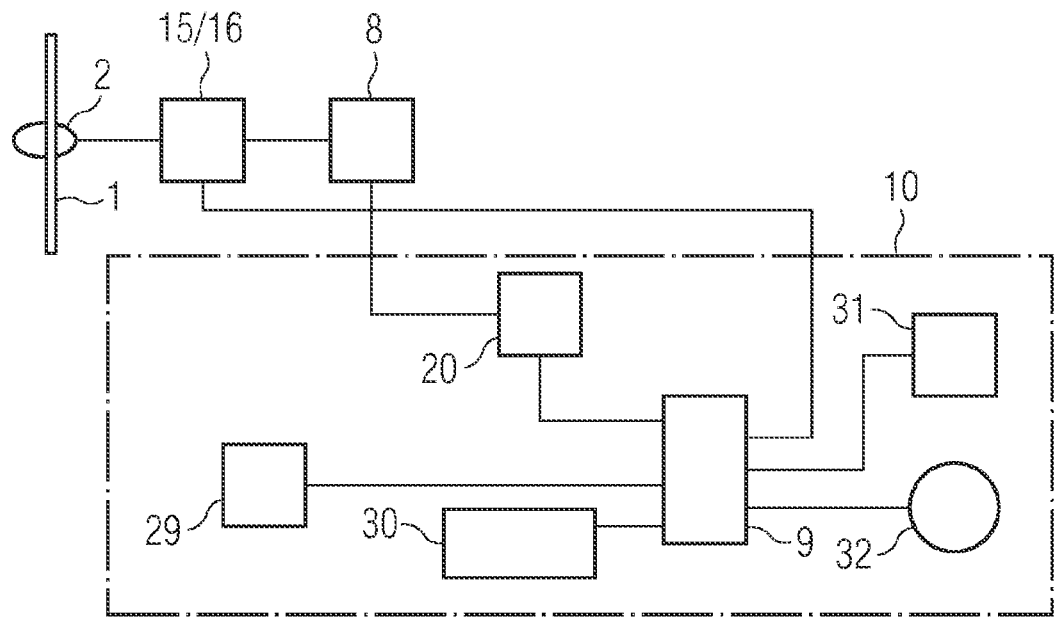
FIG. 10 shows a block diagram as per FIG. 8 with a different selection of the components.

FIG. 10 shows a block schematic diagram of a device for supplying energy as per FIG. 8 with a different selection of the components. The components of the example in FIG. 10 correspond to components of the diagram in FIG. 8 and are denoted by the same reference characters. In the example of FIG. 10, the components for voltage restriction and for DC conversion are omitted. Furthermore, the dash-dot outline in FIG. 10 indicates that in addition to the sensors 31, 32, the sensor arrangement 10 in this example can include the switching module 9, the component for energy storage 20, the communications module 29 and the data store 30. In this example, the arrangement of the components can also be implemented in an alternative manner. In particular, the component for rotational speed measurement 15 and/or for current signature analysis 16 is omitted.

Figure 11:
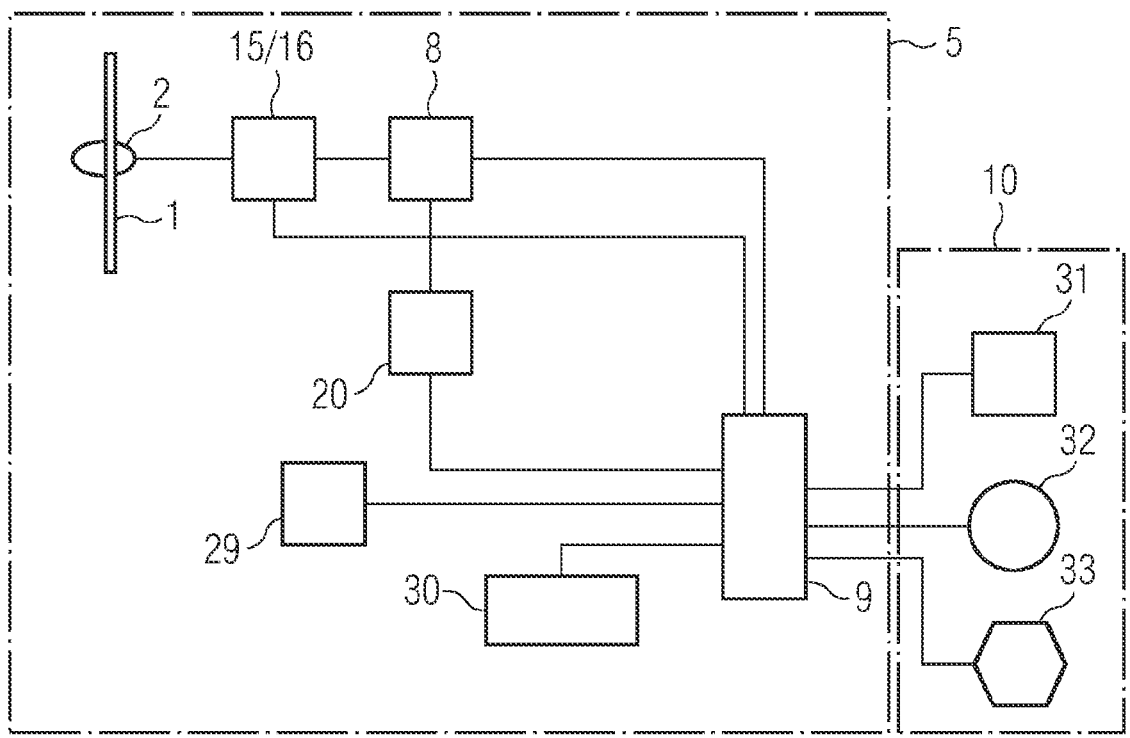
FIG. 11 shows a block diagram as per FIG. 10 with a different selection and arrangement of the components.

FIG. 11 shows a block schematic diagram of a device for supplying energy as per FIG. 10 with a different selection and arrangement of the components. The components of the example in FIG. 11 correspond to components of the diagram in FIG. 9 and are denoted by the same reference characters. The dash-dot outline in FIG. 11 indicates that the component for rectification 8, the switching module 9, a component for DC conversion 19, the component for energy storage 20, the communications module 29 and the data store 30 can be arranged in a housing 5 of the first electrical conductor 1 and the second electrical conductor 2, while the sensor arrangement 10 contains the sensors 31, 32 and 33. A different distribution of the components over the housing 5 and the sensor arrangement 10, which can be installed in a sensor box, is possible instead of this. In the example of FIG. 11, components can also be arranged outside the housing 5 or the sensor box 3. The housing 5 and/or the sensor box 3 can be omitted in particular. The component for rotational speed measurement 15 and/or for current signature analysis 16 can be omitted.

The device described is in particular part of a system which supplies energy to a sensor arrangement for the purpose of acquiring data from a vehicle component. The energy supply is intended specifically for a motor/transmission sensor application, for example. In such a system, electrical energy is decoupled inductively from the traction motor cable, in particular by means of a coil which is arranged concentrically around the traction motor cable.

The device and the system have the advantage in particular that long cable connections and plug connections to the vehicle electrics are avoided. Furthermore, a comparatively high and largely continuous energy supply is achieved, which has inter alia the following advantages: data can be continuously acquired, processed and optionally also stored via the sensor or sensors; the energy supply is particularly suitable for wireless data transfer; maintenance of a battery is not required; and a plurality of sensor applications can be supplied via very short and autonomous cable connections. Moreover, the supply frequency of the traction motor (basic motor frequency) can be detected and, taking into account the number of pole pairs, the rotational speed of the traction motor can be determined therefrom. In addition, converter clock inhibits during which the alternating voltage is disconnected can be bridged with the aid of simple energy stores.

In the method for supplying energy to a switching module and/or a sensor arrangement of a vehicle component, an alternating voltage is applied to a first electrical conductor, which connects a converter to a motor, in order to generate a further alternating voltage in a second electrical conductor, this having an inductive coupling to the first electrical conductor, by means of induction and thus to supply electrical energy to a switching module and/or a sensor arrangement. The following advantages inter alia are achieved using this method: a reliable, wireless and adequate energy supply is ensured for a sensor application which is mounted on or in a vehicle component; this type of energy supply also allows at least as far as possible continuous and wireless data communication via send and receive facilities which are attached to and/or positionally fixed on the vehicle; the rotational speed of motor, transmission and/or drive axle can be ascertained without additional sensor systems and more accurately than with magnetic field sensors, for example.

The invention is explained and described in detail above with reference to exemplary embodiments, but is not restricted to these. Variations derived from the foregoing description by a person skilled in the art lie within the scope of the invention.

The invention claimed is:

1. A device for supplying energy to a sensor arrangement in a rail vehicle, wherein a first electrical conductor connects a motor of the rail vehicle, the device comprising:
   a second electrical conductor having an inductive coupling to the first electrical conductor that connects the motor of the rail vehicle, and said first electrical conductor being at least part of a motor cable connecting a converter to the motor;
   a switching module to be operated by an operating voltage, said switching module being configured to process signals of at least one sensor for acquiring data and/or a state of a vehicle component of the rail vehicle, and said at least one sensor being part of a sensor arrangement and said switching module being connected to the sensor arrangement or forming a part of the sensor arrangement;

said switching module being connected to said second electrical conductor, and second electrical conductor being configured to generate the operating voltage for said switching module from an alternating voltage carried by the first conductor, by way of induction in said second electrical conductor; and at least one segment of said second electrical conductor being formed as a winding of a coil, and said coil having an annular core and said core surrounding the first electrical conductor concentrically.

2. The device according to claim 1, wherein the sensor arrangement is configured to acquire data from the motor, from a transmission, from a fan motor, from a pump motor, or from a compressor motor, each being a component of the vehicle.

3. The device according to claim 2, wherein the component of the vehicle is disposed in or on a bogie of the rail vehicle.

4. The device according to claim 2, wherein the component of the vehicle is a drive motor of the rail vehicle.

5. The device according to claim 1, further comprising a rectifier component connected between said second electrical conductor and said switching module.

6. The device according to claim 1, further comprising a component for energy storage, which is connected to said second electrical conductor and to said switching module.

7. The device according to claim 1, wherein the first electrical conductor forms at least a part of a motor cable and said coil surrounds the motor cable.

8. The device according to claim 1, further comprising a component for rotational speed measurement attached to said second electrical conductor and configured to determine a rotational speed of the motor from a frequency of an operating current that flows in the first conductor.

9. The device according to claim 1, further comprising a component for current signature analysis attached to said second electrical conductor and configured to analyze a frequency spectrum of an operating current that flows in the first conductor.

10. A method for supplying energy to a sensor arrangement in a rail vehicle, the method which comprises:

applying an alternating voltage to a first electrical conductor through which a current flows at least some of the time and which connects a converter to a motor of the rail vehicle, wherein the first electrical conductor is at least part of a motor cable which connects a converter to the motor;

generating a further alternating voltage by induction into a second electrical conductor, which has an inductive coupling to the first electrical conductor, and wherein at least one segment of said second electrical conductor is formed as a winding of a coil, and said coil has an annular core and said core surrounds the first electrical conductor concentrically; and using the further alternating voltage to supply energy to a switching module which serves to process signals of at least one sensor for acquiring data and/or a state of a vehicle component of the rail vehicle, wherein the at least one sensor is part of a sensor arrangement, and the switching module is connected to the sensor arrangement or forms a part of the sensor arrangement.

* * * * *